United States Patent [19]

Luckenbach

[11] 4,176,084
[45] Nov. 27, 1979

[54] PROCESS FOR REGENERATING METAL-CONTAMINATED HYDROCARBON CONVERSION CATALYSTS

[75] Inventor: Edward C. Luckenbach, Mountainside, N.J.

[73] Assignee: Exxon Research & Engineering Co., Florham Park, N.J.

[21] Appl. No.: 850,716

[22] Filed: Nov. 11, 1977

Related U.S. Application Data

[63] Continuation of Ser. No. 594,121, Jul. 8, 1975, abandoned.

[51] Int. Cl.² ............... B01J 21/20; B01J 29/38; C10G 11/04; C10G 11/18
[52] U.S. Cl. .................... 252/417; 208/113; 208/120; 208/164; 252/419
[58] Field of Search ............... 252/417, 419; 208/52 CT, 113, 120, 164

[56] References Cited

U.S. PATENT DOCUMENTS

| | | | |
|---|---|---|---|
| 2,831,800 | 4/1958 | Kelso | 252/417 |
| 3,193,494 | 7/1965 | Sanford et al. | 208/113 |
| 3,821,103 | 6/1974 | Owen et al. | 252/417 |
| 3,862,898 | 1/1975 | Boyd et al. | 208/113 |
| 3,886,060 | 5/1975 | Owen | 208/120 |
| 3,893,812 | 7/1975 | Conner et al. | 23/288 B |
| 3,909,392 | 9/1975 | Horecky, Jr. et al. | 208/120 |
| 3,926,778 | 12/1975 | Owen et al. | 208/164 |
| 3,944,482 | 3/1976 | Mitchell et al. | 208/120 |
| 3,970,587 | 7/1976 | Shimmar et al. | 252/417 |
| 4,035,284 | 7/1977 | Gross et al. | 252/419 |

*Primary Examiner*—P. E. Konopka
*Attorney, Agent, or Firm*—James H. Callwood; John W. Ditsler

[57] ABSTRACT

Hydrocarbon conversion catalysts which have become deactivated by the deposition of coke and metal contaminants such as nickel, iron, vanadium, etc., are regenerated under conditions which include temperatures in excess of 1300° F. and the periodic use of an amount of oxygen which is in excess of that required to completely burn the coke to $CO_2$. In a hydrocarbon conversion process whereby a metal-contaminated heavy feed is contacted at conversion conditions with a cracking catalyst to produce lower boiling hydrocarbon products and a spent catalyst having coke and said metal contaminant deposited thereon and wherein said spent catalyst is reactivated in a regeneration zone at elevated temperatures in the presence of $O_2$ to produce a regenerated catalyst and a flue gas containing more than 2 vol. % CO, the improvement which comprises periodically increasing the amount of $O_2$ introduced into said regeneration zone at a temperature in excess of 1300° F. so that the level of $O_2$ is periodically in excess of the amount required to completely burn said deposited coke to $CO_2$, thereby reducing the poisoning effect of the deposited metals present on the regenerated catalysts.

8 Claims, 3 Drawing Figures

PROCESS FOR REGENERATING METAL-CONTAMINATED HYDROCARBON CONVERSION CATALYSTS

This is a continuation, of application Ser. No. 594,121, filed July 8, 1975 now abandoned.

BACKGROUND OF THE INVENTION

1. Field of the Invention

This invention relates to a process for regenerating catalysts employed for the conversion of hydrocarbons. More particularly, the invention relates to the regeneration of fluid cracking catalysts which have become poisoned by various metal contaminants.

2. Description of the Prior Art

Various processes such as cracking, hydrocracking, etc., are known for the conversion of hydrocarbons to lower molecular weight products. The catalytic cracking of heavy petroleum fractions is one of the major refining operations employed in the conversion of crude petroleum oils to desirable fuel products such as heating oils and high-octane gasoline. Illustrative of "fluid" catalytic conversion processes is the fluid catalytic cracking process wherein suitably preheated high molecular weight hydrocarbon liquids and vapors are contacted with hot, finely-divided, solid catalyst particles, either in a fluidized bed reactor or in an elongated riser reactor, and maintained at an elevated temperature in a fluidized or dispersed state for a period of time sufficient to effect the desired degree of cracking to lower molecular weight hydrocarbons.

In the catalytic process, some non-volatile carbonaceous material, or "coke," is deposited on the catalyst particles. As coke builds up on the catalyst, the activity of the catalyst for cracking and the selectivity of the catalyst for producing desirable products diminish. The catalyst particles may recover a major proportion of their original activity by removal of most of the coke by a suitable regeneration process. Catalyst regeneration is accomplished by burning the coke deposits from the catalyst surface with an oxygen-containing gas, such as air. Many regeneration techniques are practiced commercially whereby a significant restoration of catalyst activity is achieved. The burning of coke deposits from the catalysts requires a large volume of oxygen or air and produces substantial quantities of CO and $CO_2$. Ordinarily, the regeneration is conducted at a temperature ranging from about 1050° to about 1250° F. The effect of any increase in temperature is reflected in an increased rate of combustion of carbon and a more complete removal of carbon, or coke, from the catalyst particles.

A major problem often encountered in the practice of fluid catalyst regeneration is the phenomenon known as "afterburning," which is descriptive of the further combustion of CO to $CO_2$. The operators of fluid catalyst regenerators avoid afterburning because it could lead to very high temperatures which are damaging to equipment and possibly to the catalyst particles.

More recently, as operators have sought to raise regenerator temperatures for various reasons, elaborate arrangements have also been developed for control of regenerator temperatures at the point of incipient afterburning by suitable means for control of the oxygen supplied to the regenerator. However, with the control of afterburning, the flue gas from catalyst regenerators usually contains very little oxygen and a substantial quantity of CO and $CO_2$. In order to substantially eliminate the CO from the flue gas and to recover heat energy from the combustion of CO to $CO_2$, the regenerator flue gas is generally sent to a CO boiler wherein the combustion of CO is performed.

Most recently, there has appeared in the literature, e.g., U.S. Pat. Nos. 3,838,036 and 3,844,973, various techniques for substantially eliminating both afterburning and the presence of CO in the regenerator effluent flue gas. These techniques generally involve the use of relatively high regeneration temperatures, e.g., 1275°–1400° F., and the presence of relatively high concentrations of $O_2$ in the regenerator so that there is substantially complete combustion of the catalyst coke and the resultant CO to $CO_2$ in the fluidized dense phase and the dilute phase catalyst zones of the regeneration vessel.

Unfortunately, the techniques recently developed for the regeneration of cracking catalysts to substantially eliminate the presence of CO in the regenerator effluent flue gas are not readily adaptable to the regeneration of fluidized catalysts which have been employed for the conversion of heavy petroleum fractions such as deasphalted oils and residua. It is found that the cracking of such heavy petroleum fractions results in the deposition of relatively high amounts of coke and metal poisons upon the spent catalysts The substantially complete combustion of the enormous amounts of coke deposited upon the catalysts for the conversion of heavy petroleum fractions would require enormous amounts of air or oxygen to completely convert the carbon and resultant CO to $CO_2$. In addition, the presence of such large quantities of coke upon the spent catalyst will produce substantial quantities of CO in the regeneration zone which will be very difficult to completely burn in the regeneration zone without resulting in "afterburning."

Accordingly, in the regeneration of the severely coked catalyst particles, it will be desirable to control the amount of oxygen or air delivered to the regenerator so that there will be insufficient amounts therein to completely burn the resultant CO to $CO_2$. The CO present in the regenerator flue gas will then be conventionally removed in a CO boiler. Such a regeneration procedure is, however, deficient in that the regenerated catalyst is still partially poisoned by the presence of metal contaminants from the feedstocks such as nickel and vanadium.

SUMMARY OF THE INVENTION

It has now been found that the contaminating effect of certain catalyst poisons such as nickel, vanadium, iron, etc., can be substantially reduced or eliminated by subjecting the metal-contaminated catalyst to temperatures in excess of 1300° F. in the presence of oxygen in an amount which is in excess of that required to completely burn deposited coke to $CO_2$ during the catalyst regeneration.

More particularly, in a hydrocarbon conversion process whereby a metal-contaminated heavy feed is contacted at conversion conditions with a hydrocarbon conversion catalyst to produce lower boiling hydrocarbon products and a spent catalyst having coke and said metal contaminant deposited thereon and wherein said spent catalyst is reactivated in a regeneration zone at elevated temperatures in the presence of oxygen to produce a regenerated catalyst and a flue gas containing more than 2 volume % CO, the invention relates to an improvement for said process wherein the amount of $O_2$ introduced into the regeneration zone is periodically increased so that the level of $O_2$ present therein is periodically in excess of the amount required to completely burn said deposited coke and resultant CO to $CO_2$, thereby reducing the poisoning effect of the deposited metals present on the regenerated catalyst. Thus, the sequential use in the regenerator of an excess and a deficiency of $O_2$ at relatively high temperatures will reduce the poisoning effect of the metals deposited on the catalyst and eliminate the need for a continuous supply of large quantities of $O_2$ and the attendant evolution of large quantities of heat in the regeneration zone.

The catalysts which can be regenerated in accordance with this invention include those well known to the art of fluidized catalytic hydrocarbon conversion, particularly catalytic cracking catalysts which have been deactivated by the presence of relatively large amounts of coke and deposited metal poisons. In general, these include the highly active zeolite-containing catalysts and the amorphous silica-alumina catalysts.

The zeolite-type catalysts which are regenerated in accordance with the invention are exemplified by those catalysts wherein a crystalline aluminosilicate is dispersed with the siliceous matrix. Among the well-recognized types of zeolites useful herein are the "Type A," "Type Y," "Type X," mordenite, faujasite, erionite, and the like. A further description of these zeolites and their methods of preparation are given, for example, in U.S. Pat. Nos. 2,882,243; 2,882,244; 3,130,007; 3,410,808 and 3,733,390. Because of their extremely high activity, these zeolite materials are deposited with a material possessing a substantially lower level of catalytic activity, siliceous matrix which may be of the synthetic, semi-synthetic or natural type. The matrix materials may include silica-alumina, silica-gel, silica-magnesia, etc.

The zeolite which is incorporated into the matrix is preferably exchanged with various cations to reduce the alkali metal oxide content thereof. In general, the alkali metal oxide content of the zeolite is reduced by ion exchange treatment with solutions of ammonium salt, or salts of metals in Groups II to VIII of the Periodic Table or the rare earth metals. Examples of suitable cations include hydrogen, ammonium, calcium, magnesium, zinc, nickel, molybdenum and the rare earths such as cerium, lanthanum, praseodymium, neodymium, and mixtures thereof.

The spent catalysts which are regenerated in accordance with the invention contain deposits of coke and various metals such as vanadium, nickel, iron, etc. as a result of the catalyst exposure to the feedstock in the hydrocarbon conversion zone. Typically, the amount of coke or carbon deposited on the spent catalyst will be in the range of 0.005 to 0.02 lb. of carbon/lb. of catalyst and the amount of metals deposited will be in the range of 100 to 800 ppm. Those catalysts used in heavy feed conversion may have as much as 0.005 to 0.02 lb. of carbon/lb. of catalyst and as much vanadium and/or nickel as 1000 ppm (parts per million) to 2 wt. %.

The amount of coke or metal deposited upon the catalyst is directly proportional to the Conradson carbon and metals content of the feedstock employed. In general, it is found that those feedstocks having a relatively high Conradson carbon and/or high metals content are particularly adaptable to the process of this invention. Accordingly, the feedstock charged to the conversion zone may have a Conradson carbon greater than 2 wt. %, e.g. 5–30 wt. %, and a metals content greater than 10 ppm of combined metals such as vanadium, nickel, iron, etc. Typical and preferred feedstocks include heavy crudes and residua such as devacuumed gas oils which boil within the range starting at about 850° F. or higher at atmospheric pressure. Other feedstocks include visbreaker bottoms, heavy liquids from coal, shale and tar sand processing and mixtures thereof.

The regeneration procedure during normal operation (i.e., periods during which excess oxygen is not employed) will be carried out at temperatures in excess of 1200° F. depending on the catalyst type, with the more stable catalysts being regenerated at higher temperatures. In view of the relatively large amount of coke deposited upon the catalyst and the potential excessive heat evolution, the regenerator is normally operated under conditions so that the amount of oxygen present therein is insufficient to completely burn the resultant CO to $CO_2$. The resultant regenerator effluent containing CO may then be passed to a CO boiler to reduce the CO to a desirable level. During the normal regeneration operation, i.e. no excess $O_2$, the poisoning effect of the deposited metals on the catalyst will not be materially reduced. However, it has unexpectedly been found that the periodic use of excess oxygen in the regeneration zone at temperatures ranging from 1300°–1450° F. markedly reduces the contaminating effect of the metals which the feedstock has deposited upon the catalyst surface. The poisoning effect of metals such as nickel and vanadium is thus reduced by exposing the catalyst to free oxygen at temperatures in excess of 1300° F.

The establishment of conditions of excess oxygen in the regeneration zone may be accomplished by various procedures. For example, the desired $O_2$ level may be accomplished merely by increasing the rate of air or oxygen charged to the regenerator while maintaining the fresh feed rate and the catalyst circulation rate at relatively constant levels. Alternately, the addition of $O_2$ to the regeneration zone may be maintained at a constant level while the fresh feed rate and catalyst circulation rate are decreased. The desired conditions of excess $O_2$ and elevated temperatures could also be accomplished by passing the catalyst from the main catalyst regeneration zone to an additional regeneration zone wherein the partially regenerated (i.e., a substantial portion of the deposited coke having been removed by burning) catalyst is exposed to oxygen and temperatures in excess of 1300° F. to reduce the contaminating effect of deposited metals as described in FIGS. 2 and 3.

PREFERRED EMBODIMENTS OF THE INVENTION

Preferred embodiments of the invention will be described with reference to the accompanying figures.

Figure 2:
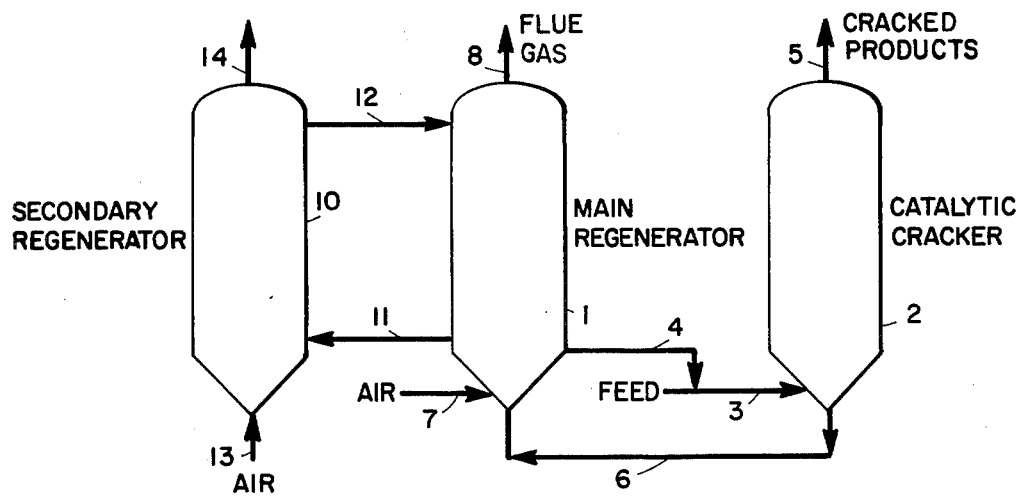
Figure 3:
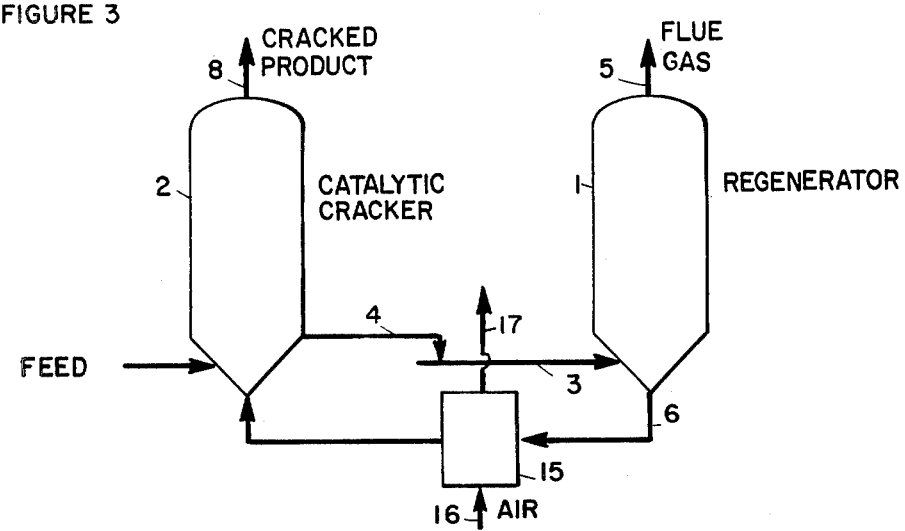

As indicated above, the catalyst may be regenerated by periodically introducing excess oxygen into the regeneration zone (FIG. 1), or by recirculating the catalyst from a main regeneration zone to a secondary zone containing excess oxygen (FIG. 2), or by contacting the regenerated catalyst from the regeneration zone with oxygen at elevated temperatures prior to entry of the regenerated catalyst to the conversion zone (FIG. 3).

Figure 1:
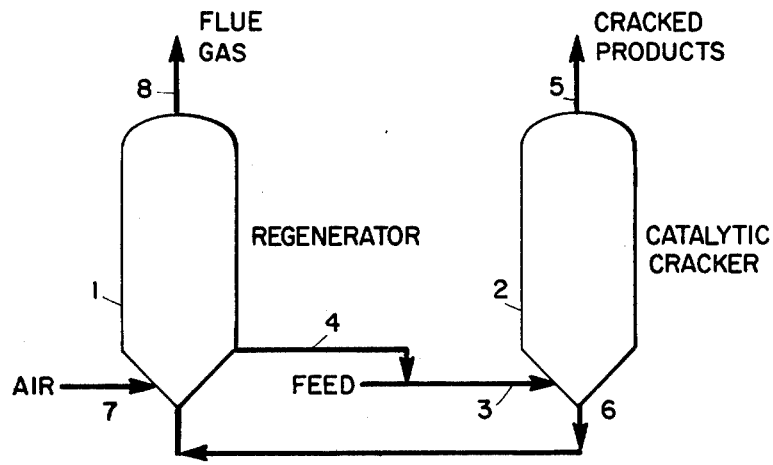
FIGS. 1, 2 and 3 are diagrammatic flow plans of three techniques for regenerating the catalyst in accordance with the invention for reducing the contaminating effect of metals deposited upon the catalyst during the conversion of the feedstock.

FIG. 1 shows a typical flow scheme for the regeneration of fluid catalyst employed for the catalytic cracking of a petroleum feedstock. Referring to FIG. 1, a hydrocarbon heavy feed having a metals concentration of about 40 ppm such as atmospheric tower bottoms from a crude distillation unit running on a mid-continent crude is delivered via line 3 wherein it is mixed with the regenerated catalyst supplied via line 4 from regenerator 1 and thereafter introduced into catalytic cracker 2. The gaseous product produced in the cat cracker is passed through one or more cyclones (not shown) and thereafter drawn off via line 5. Spent catalyst from catalytic cracker 2 is removed via line 6 which delivers the catalyst to regenerator 1 wherein it is contacted with combustion air introduced via line 7. The temperatures of the catalyst dense bed and dilute phase within the regenerator 1 are in the range of 1325° F.–1350° F. and 1350° F.–1375° F., respectively. The operation of regenerator 1 is conducted so that the amount of air introduced into line 7 is usually at a level which is insufficient to completely combust the coke on the catalyst to $CO_2$. For example, the spent catalyst may have a coke level of about 1.4 wt. % so that the amount of air normally introduced into the regenerator during normal operation may vary within the range of 10–18 lbs./lb. of coke introduced into the regenerator.

The air introduced via line 7 is periodically increased so that the level of $O_2$ present in regenerator 1 is periodically in excess of the amount required to completely burn the coke and resultant CO to $CO_2$. As previously indicated, this presence of excess $O_2$ reduces the poisoning effect of the deposited metals present on the regenerated catalysts. The periods at which excess air will be employed in the regenerator will thus vary directly in accordance with the amount of metal contaminants deposited on the catalyst. Ordinarily, excess air (i.e. a level greater than the amount required to completely burn coke and CO to $CO_2$) will be employed for 1 to 20% of the time the regenerator is in operation.

FIGS. 2 and 3 represent additional embodiments of the process of this invention. Referring to FIG. 2, secondary regenerator is operated in parallel with main regenerator 1 so that a portion (e.g. the ratio of catalyst in main regenerator/catalyst in secondary regenerator may be 1/10) of the regenerated catalyst is circulated between the regenerators by means of lines 11 and 12. Secondary regenerator 10 is operated at a temperature in the range of 1300° F.–1400° F., for example, 1340° F., and excess air (over that required to completely burn coke to $CO_2$) is introduced via line 13 so that the effluent from secondary regenerator 10 will contain oxygen, usually in amounts ranging from 2 to 4 volume %.

In a further embodiment, FIG. 3 illustrates a regeneration operation where the regenerated catalyst from the regenerator is passed through an oxygen treating zone 15 prior to its introduction into catalytic cracker 2. The conditions in oxygen treating zone 15 are maintained in the range of 1300° F.–1375° F. and air is introduced via line 16 so that the $O_2$ level of the offgas vented via line 17 is in the range of 2 to 4 volume %, e.g. 2.5 volume %.

The flow scheme of FIG. 1 was tested in a commercially operated unit wherein a metal contaminated low sulfur Canadian gas oil was contacted with a commercially available crystalline aluminosilicate zeolite-containing catalyst sold under the trade name CBZ-1 and supplied by the Davison Division of W. R. Grace & Company. The spent catalyst delivered to the regenerator had a coke on catalyst level of 1.5% and a vanadium and nickel content of 1000 ppm. Periodically, the fresh feed rate and the catalyst circulation rate were reduced while the oxygen feed to the regenerator was kept constant so that there was a periodic excess of oxygen in the regeneration zone. The conditions employed in both the normal cycle employing less than the theoretical amount of oxygen required to completely burn CO and the passivation cycle (i.e., the period during which excess oxygen is added to reduce the poisoning effect of deposited metals) is shown below. The cycle sequence employed included a normal operation of about 24 hours, followed by a passivation period of about 3–4 hours. The results given below show that operation after the passivation period was markedly improved as evidenced by the lower gas make (absorber offgas) and a significant reduction in the hydrogen to methane ratio of the absorber offgas. In this connection, the coke on regenerated catalyst is substantially the same in both the normal and passivation cycles, thus indicating that the poisoning effect of the deposited metals has been reduced. Since there were no other significant changes in process conditions, the altered regenerator conditions resulted in passivation of the deposited metals.

|  | Normal Operation | Passivation Period | Return to Normal |
|---|---|---|---|
| Fresh Feed Rate, BSD[1] | 8,250 | 6,600 | 8,273 |
| Conversion, % 430 | 69.5 | 80.6 | 67.6 |
| Reactor Temperature, °F. | 958 | 912 | 953 |
| Regenerator |  |  |  |
| Bed Temperature, °F. | 1,340 | 1,310 | 1,340 |
| Cyclone Inlet, °F. | 1,370 | 1,375 | 1,370 |
| Flue Gas Composition, % |  |  |  |
| CO | 1–2 | 500 ppm | 1–2 |
| $O_2$ | 0 | 1.5–2.0 | 0 |
| Absorber offgas FOE B/D[2] | 232 | 201 | 205 |
| Poly Feed[3], Vol % Fresh Feed | 20.7 | 22.0 | 20.71 |
| Hydrogen/Methane Yield Ratio[4] | 0.4 | — | 0.29 |

[1] Barrels per stream day
[2] Fuel oil equivalent
[3] $C_3/C_4$ stream to poly plant
[4] of absorber offgas

What is claimed is:

1. In a hydrocarbon conversion process whereby a metal contaminated hydrocarbon feed containing more than 10 PPM of nickel and vanadium is contacted in a conversion zone with a hydrocarbon conversion catalyst to produce lower boiling hydrocarbon products and a spent catalyst having coke and said metal contaminant deposited thereon and wherein said spent catalyst is reactivated in a fluid bed regeneration zone operated at elevated temperatures in the presence of oxygen at a concentration level which is insufficient to completely combust said coke on the catalyst to $CO_2$ thereby producing a regenerated catalyst and a flue gas containing more than 2 volume % CO, the improvement which comprises periodically operating said fluid bed regeneration zone at conditions of excess oxygen and at a temperature in excess of 1300° F. so that the level of oxygen therein is for a period ranging from 1 to 20% of the time said fluid bed regenerator is in operation in excess of the amount required to completely burn said deposited coke to $CO_2$, thereby reducing the poisoning effect of the deposited metals present on the regenerated catalyst.

2. The process of claim 1 wherein said hydrocarbon feed is a petroleum crude or residua.

3. The process of claim 2 wherein said feed has a Conradson Carbon greater than 2.

4. The process of claim 3 wherein said spent catalyst contains at least 1.2 lbs. of carbon per 100 lbs. of catalyst.

5. In a hydrocarbon conversion process whereby a metal contaminated hydrocarbon feed containing more than 10 PPM of nickel and vanadium is contacted in a conversion zone with a hydrocarbon conversion catalyst to produce lower boiling hydrocarbon products and a spent catalyst having coke and said metal contaminants deposited thereon, and wherein said spent catalyst is reactivated in a fluid bed main regeneration zone operated at elevated temperatures in the presence of oxygen at a concentration level which is insufficient to completely combust said coke on the catalyst to $CO_2$, thereby producing a partially regenerated catalyst and a flue gas containing more than 2 volume % CO, the improvement which comprises circulating a portion of said partially regenerated catalyst between said main regeneration zone and a secondary regeneration zone segregated from said main regeneration zone, said secondary regeneration zone being maintained at a temperature in excess of 1300° F. and containing oxygen in an amount which is in excess of that required to completely combust the coke remaining on said partially regenerated catalyst to $CO_2$ such that the flue gas from said secondary regeneration zone will contain oxygen, thereby producing a regenerated catalyst from which the poisoning effect of the deposited metals on the catalyst has been reduced.

6. The process of claim 5 wherein said spent catalyst contains at least 1000 PPM of nickel and vanadium.

7. The process of claim 6 wherein said spent catalyst contains at least 1.2 lbs of carbon per 100 lbs of catalyst.

8. The process of claim 5 wherein the catalyst thus circulated between the main regeneration zone and the secondary regeneration zone is withdrawn from the main regeneration zone and passed to said hydrocarbon conversion process.

* * * * *